United States Patent
Tokonami et al.

(10) Patent No.: US 12,476,268 B2
(45) Date of Patent: Nov. 18, 2025

(54) ELECTROCHEMICAL DEVICE AND METHOD OF PRODUCING THE SAME

(71) Applicant: UNIVERSITY PUBLIC CORPORATION OSAKA, Osaka (JP)

(72) Inventors: Shiho Tokonami, Sakai (JP); Takuya Iida, Sakai (JP)

(73) Assignee: UNIVERSITY PUBLIC CORPORATION OSAKA, Osaka (JP)

( * ) Notice: Subject to any disclaimer, the term of this patent is extended or adjusted under 35 U.S.C. 154(b) by 496 days.

(21) Appl. No.: 17/998,765

(22) PCT Filed: May 14, 2021

(86) PCT No.: PCT/JP2021/018406
§ 371 (c)(1),
(2) Date: Nov. 14, 2022

(87) PCT Pub. No.: WO2021/230351
PCT Pub. Date: Nov. 18, 2021

(65) Prior Publication Data
US 2023/0197995 A1 Jun. 22, 2023

(30) Foreign Application Priority Data
May 14, 2020 (JP) .................................. 2020-085128

(51) Int. Cl.
*H01M 8/16* (2006.01)
*H01M 4/86* (2006.01)

(52) U.S. Cl.
CPC ........... *H01M 8/16* (2013.01); *H01M 4/8626* (2013.01)

(58) Field of Classification Search
CPC .......... H01M 8/16; H01M 8/18; H01M 8/184; H01M 8/22; H01M 4/8626; H01M 4/8605; H01M 4/861
See application file for complete search history.

(56) References Cited

U.S. PATENT DOCUMENTS 8,852,765 B2 * 10/2014 Hashimoto ......... H01M 4/8605
429/2
2009/0169924 A1 * 7/2009 Ringeisen ............ B01D 61/027
429/2

(Continued)

FOREIGN PATENT DOCUMENTS

JP H04-337453 A 11/1992
JP 6375578 B2 8/2018

(Continued)

OTHER PUBLICATIONS

Komarek, Jiri et al.; "Taxonomic Classification of Cyanoprokaryotes (Cyanobacterial Genera) 2014, Using a Polyphasic Approach"; Preslia 86; pp. 295-335.

(Continued)

*Primary Examiner* — Raymond Alejandro
(74) *Attorney, Agent, or Firm* — Studebaker Brackett PLLC

(57) ABSTRACT

The present invention provides an electrochemical device utilizing microorganisms and capable of outputting sufficient power in a short time after boot-up, by means of an electrochemical device comprising a first electrode comprising a surface layer portion having at least one pore with an opening, wherein the pore has a conductive section at least on an inner face thereof, the first electrode has a conduction path that electrically connects the conductive sections of the pores to each other, and each pore carries electron-donating microorganisms of different classifications or different electron-donating microorganisms of the same classification, or electron-donating microorganisms with average particle sizes significantly different from each other; and a method of producing the same.

15 Claims, 14 Drawing Sheets

(56) References Cited

U.S. PATENT DOCUMENTS

| | | |
|---|---|---|
| 2013/0230744 A1 | 9/2013 | Hashimoto et al. |
| 2020/0083553 A1* | 3/2020 | Solina ................ H01M 4/9008 |
| 2020/0182770 A1 | 6/2020 | Tokonami et al. |

FOREIGN PATENT DOCUMENTS

| | | |
|---|---|---|
| JP | 2018-142541 A | 9/2018 |
| WO | 2012/066806 A1 | 5/2012 |

OTHER PUBLICATIONS

International Search Report issued in PCT/JP2021/018406; mailed Jul. 20, 2021.

\* cited by examiner (a)

(b)

(a)

(b)

(a)

(b)

(a)
Synechococcus

WITH MAGNETIC NANOPARTICLES | WITHOUT MAGNETIC NANOPARTICLES (b)
Synechocystis

WITH MAGNETIC NANOPARTICLES | WITHOUT MAGNETIC NANOPARTICLES (c)
Synechococcus+Synechocystis

WITH MAGNETIC NANOPARTICLES (COMPOSITE) | WITHOUT MAGNETIC NANOPARTICLES (a)

(b)

(a) Synechococcus (b) Synechocystis (c) Synechococcus+Synechocystis (a)

(b)

(a)

(b)

(a)

(b)

ELECTROCHEMICAL DEVICE AND METHOD OF PRODUCING THE SAME

TECHNICAL FIELD

The present invention relates to an electrochemical device that utilizes microorganisms, most notably a microbial solar cell, and a method of producing the same.

BACKGROUND ART

Conventional power generation systems that utilize fossil fuels, such as thermal-power generation systems, are accompanied by serious environmental issues such as global warming, which is caused by greenhouse gas emission, as well as fossil fuel exhaustion. As an eco-friendly system to replace them, electrochemical devices that utilize microorganisms, most notably microbial solar cells, have been receiving attention. A microbial solar cell is a system that is capable of generating power solely from sunlight and water by utilizing photosynthetic bacteria and microorganisms of the phylum Cyanobacteria, and this system discharges no effluent, lasts long, and is hence clean and sustainable, which is advantageous.

However, electrochemical devices utilizing microorganisms are generally low in output current density (the value obtained by dividing current by electrode area), and therefore, in order to bring them into practical use, it is necessary to enhance their power output (hereinafter, simply called an output). Another issue with conventional electrochemical devices utilizing microorganisms is that a planar electrode such as ITO is used as the working electrode, which traps only a small number of bacteria on the electrode at the start of operation, and therefore, to have an increased number of bacteria, it needs to depend on proliferation of the bacteria, resulting in a long waiting time of several dozen hours or longer from boot-up in order to attain sufficient output.

Moreover, International Patent Laying-Open No. WO 2012/66806 (PTL 1) discloses a microbial fuel cell which has an increased electrode surface area attributable to a carbon nanowire structure formed on the surface of graphite felt or graphite plate, in order to attain an enhanced output current density. The increased electrode surface area could indeed improve the output of electrochemical devices utilizing microorganisms, but there is room for further improvement from the viewpoint of attaining sufficient output in a short time after boot-up.

CITATION LIST

Patent Literature

PTL 1: International Patent Laying-Open No. WO 2012/66806
PTL 2: Japanese Patent No. 6375578

SUMMARY OF INVENTION

Technical Problem

The present invention has been devised to solve the above-described problems, and has an object to provide an electrochemical device utilizing microorganisms and capable of outputting sufficient power in a short time after boot-up.

Solution to Problem

The present invention relates to an electrochemical device comprising a first electrode comprising a surface layer portion having at least one pore with an opening, wherein the pore has a conductive section at least on an inner face thereof, the first electrode has a conduction path that electrically connects the conductive sections of the pores to each other, and each pore carries electron-donating microorganisms of different classifications or different electron-donating microorganisms of the same classification (hereinafter, this invention is called "a first electrochemical device").

The present invention also relates to an electrochemical device comprising a first electrode comprising a surface layer portion having at least one pore with an opening, wherein the pore has a conductive section at least on an inner face thereof, the first electrode has a conduction path that electrically connects the conductive sections of the pores to each other, and each pore carries electron-donating microorganisms with average particle sizes significantly different from each other (hereinafter, this invention is called "a second electrochemical device").

In both the first electrochemical device and the second electrochemical device, the electron-donating microorganisms are preferably Cyanobacteria, and among these, a combination of *Synechocystis* and *Synechococcus* within the order Chroococcales in the class Oxyphotobacteria are more preferable.

In the second electrochemical device, the electron-donating microorganisms with average particle sizes significantly different from each other may be the same electron-donating microorganisms of the same classification.

In both the first electrochemical device and the second electrochemical device, the surface layer portion preferably has a plurality of pores arranged in a honeycomb shape.

In both the first electrochemical device and the second electrochemical device, preferably, irradiation of light having a wavelength capable of causing photosynthesis is performed.

In both the first electrochemical device and the second electrochemical device, the electron-donating microorganisms may be negatively charged, and the electron-donating microorganisms may be bonded to each other via positively-charged magnetic nanoparticles to form a composite.

Both the first electrochemical device and the second electrochemical device preferably comprise the first electrode as an anode and the second electrode as a cathode, where the second electrode is different from the first electrode.

The present invention also relates to a method of producing an electrochemical device, the method comprising: preparing an electrode comprising a surface layer portion having at least one pore with an opening, wherein the pore has a conductive section at least on an inner face thereof, and the electrode comprises a conduction path that electrically connects the conductive sections of the pores to each other; and making each pore carry electron-donating microorganisms inside thereof, wherein the electron-donating microorganisms made to be carried inside each pore are electron-donating microorganisms of different classifications or different electron-donating microorganisms of the same classification (hereinafter, this invention is called "a first production method").

The present invention also provides a method of producing an electrochemical device, the method comprising: preparing an electrode comprising a surface layer portion having at least one pore with an opening, wherein the pore has a conductive section at least on an inner face thereof, and the electrode comprises a conduction path that electrically connects the conductive sections of the pores to each other; and making each pore carry electron-donating microorganisms inside thereof, wherein the electron-donating microorganisms made to be carried inside each pore are electron-donating microorganisms with average particle sizes significantly different from each other (hereinafter, this invention is called "a second production method").

In both the first production method and the second production method, preferably, the surface layer portion of the electrode is irradiated with laser light while the electrode is in contact with a liquid containing the electron-donating microorganisms, to generate convection in the liquid to trap the electron-donating microorganisms inside the pores.

Also in both the first production method and the second production method, preferably, the electron-donating microorganisms are negatively charged and form a composite via positively-charged magnetic nanoparticles, and the composite is made trapped inside the pore by magnetic force.

Advantageous Effects of Invention

The present invention provides an electrochemical device utilizing microorganisms and capable of outputting sufficient power in a short time after boot-up, such as a highly efficient microbial solar cell.

DESCRIPTION OF EMBODIMENTS

[1] Electrochemical Device

Figure 1:
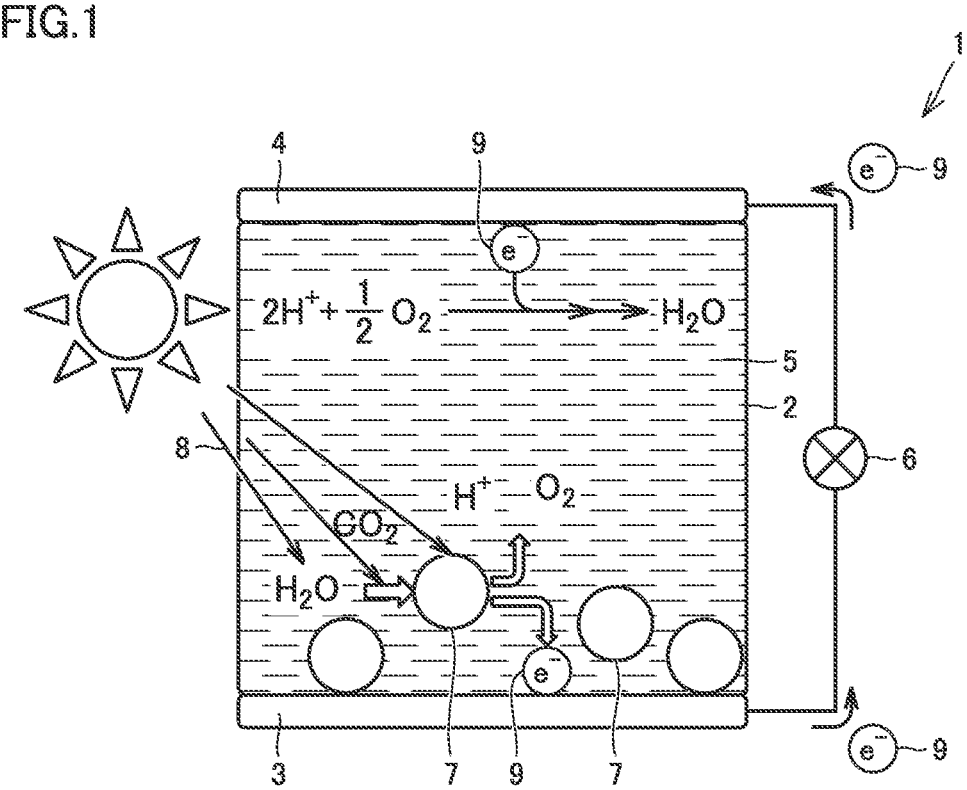
FIG. 1 is a conceptual view of a microbial solar cell 1, which is a preferable example of an electrochemical device according to the present invention.

An electrochemical device according to the present invention comprises an electrode having a surface layer portion having at least one pore with an opening ("a first electrode"). Each pore has a conductive section at least on the inner face thereof. The first electrode comprises a conduction path that electrically connects the conductive sections of the pores to each other (the above "first electrochemical device" and the above "second electrochemical device" are collectively called "an electrochemical device according to the present invention"). In the electrochemical device according to the present invention, the pore carries electron-donating microorganisms inside thereof. "Electron-donating microorganisms" refer to microorganisms that produce electrons by metabolic action. The present configuration allows for efficient transfer of the electrons, which are produced by the microorganisms, inside each pore. When photosynthetic bacteria are used as the electron-donating microorganisms, irradiation of light having a wavelength capable of causing photosynthesis (white light, such as sunlight, artificial sunlight produced from a solar simulator, or light from a fluorescent lamp, an LED, or the like) can be performed to achieve efficient electron donating for power generation applications or light sensing applications. As the wavelength capable of causing photosynthesis, a wavelength from 200 to 3500 nm, preferably a wavelength from 400 to 800 nm within near-ultraviolet to visible to near-infrared spectra can be used.

The electron-donating microorganisms trapped inside the pore in the surface layer portion of the first electrode are frequently or always in contact with the conductive section on the inner face of the pore, allowing for efficient electron transfer between the conductive section and the electron-donating microorganisms. Electrons move to reach the conductive section, then flow within the electrode through the conduction path, which electrically connects the conductive sections to each other, and then collected. Here, the distance between the microorganisms and the conduction path is very short, allowing for efficient electron transfer with relatively few resistance factors. An electrochemical device of this type is excellent in power output performance and sensitivity, making it possible to achieve a high current density with ease and in a short time.

The first electrochemical device is characterized in that the electron-donating microorganisms carried inside the pore are electron-donating microorganisms of different classifications or different electron-donating microorganisms of the same classification. Herein, the classification of the microorganisms refers to kingdom, phylum, class, order, family, genus, and species. Herein, "electron-donating microorganisms of different classifications" refers to electron-donating microorganisms of different "kingdoms", "phyla", "classes", "orders", "families", "genera", or "species", and "different electron-donating microorganisms of the same classification" refers to different electron-donating microorganisms of the same "kingdom", "phylum", "class", "order", "family", "genus", or "species". The first electrochemical device is simply required to comprise electron-donating microorganisms of different classifications or different electron-donating microorganisms of the same classification, inside each pore, and it is obvious that such electron-donating microorganisms may be of two types, three types, or more than three types.

Examples of the electron-donating microorganisms include, but are not limited to, Cyanobacteria such as *Synechocystis* sp., *Synechococcus* sp., *Arthrospira platensis* (spirulina), *Anabaena* sp. PCC 7120, *Pseudanabaena* (Limnothrix) sp. ABRG5-3, and *Halomicronema hongdechloris*, microorganisms of the genus *Shewanella* such as *S. loihica*, *S. oneidensis*, *S. putrefaciens*, and *S. algae*, microorganisms of the genus *Geobacter* such as *G. sulfurreducens* and *G. metallireducens*, microorganisms of the genus *Pseudomonas* such as *P. aeruginosa*, microorganisms of the genus *Rhodoferax* such as *R. ferrireducens*, and the like. Preferably, in the first electrochemical device, at least two types selected from the above-mentioned electron-donating microorganisms are used.

It should be noted that, in the first electrochemical device, as long as either electron-donating microorganisms of different classifications or different electron-donating microorganisms of the same classification are used, their average particle sizes (which is to be defined below) may not necessarily be significantly different from each other (being significantly different from each other is also to be defined below).

In the second electrochemical device, the plurality of electron-donating microorganisms carried inside each pore are required to have average particle sizes significantly different from each other. Herein, the "average particle size" of the electron-donating microorganisms refers to the average diameter±standard deviation for cocci such as *Synechocystis* and *Synechococcus*, and the average length of the major axis±standard deviation for bacilli such as *Shewanella loihica*. The phrase that reads "average particle sizes significantly different from each other" means that the calculated average values are different by a factor of 1.1 or more, preferably by a factor of 2 or more. Specifically, the average particle size of the electron-donating microorganisms are determined by measuring the particle sizes of targets sampled from a micrograph and calculating the average.

As for the electron-donating microorganisms for use in the second electrochemical device, the average particle size is not particularly limited as long as it can be accommodated inside the pore, and the average particle size of the electron-donating microorganisms with large average particle size is preferably within the range of 1 to 10 µm, more preferably within the range of 2 to 5 µm. From the viewpoint of accommodating electron-donating microorganisms with average particle sizes significantly different from each other, inside each pore with a high density, the ratio of the average particle size of the electron-donating microorganisms with large average particle size to the average particle size of the electron-donating microorganisms with small average particle size is preferably within the range of 1.2 to 10, more preferably within the range of 1.5 to 5.

As the electron-donating microorganisms for use in the second electrochemical device, those having significantly different average particle sizes to each other may be preferably selected from the above examples of electron-donating microorganisms preferable for use in the first electrochemical device, but it would be obvious that this is not limitative.

It should be noted that the electron-donating microorganisms for use in the second electrochemical device may be the same electron-donating microorganisms of the same classification as long as they have significantly different average particle sizes. More specifically, given the fact that there are individual variations in the particle sizes even for the same electron-donating microorganisms of the same classification, the present invention may first divide the same electron-donating microorganisms of the same classification based on the particle sizes, into groups that are significantly different to each other in average particle size, and then mix these groups for use in the present invention (this procedure is differentiated from a procedure that selects a plurality of the same electron-donating microorganisms varied in particle size from the same classification without the step of dividing into groups).

In the electrochemical device according to the present invention, the electron-donating microorganisms carried inside each pore are: (1) electron-donating microorganisms of different classifications or different electron-donating microorganisms of the same classification (for the first electrochemical device); and/or (2) electron-donating microorganisms with average particle sizes significantly different from each other (for the second electrochemical device). It would be obvious that, as in the case of a combination of *Synechocystis* and *Synechococcus* described below, the above (1) and (2) may be satisfied at the same time. The electrochemical device according to the present invention satisfying the above (1) and/or (2) makes it possible to carry electron-donating microorganisms inside each pore at a higher density than in conventional electrochemical devices, makes it possible to provide an electrochemical device utilizing microorganisms and capable of outputting sufficient power in a short time after boot-up, and, for example, makes it possible to provide a highly efficient microbial solar cell.

In the electrochemical device according to the present invention, for ordinary use, a medium is kept inside each pore and the electron-donating microorganisms are surrounded by the medium. This medium may also be called an electrolyte, and may be gas, liquid, solid, or anywhere between these states. Among these, an ion-containing liquid is preferable, and this ion-containing liquid is preferably a liquid that contains water as its main component, but this liquid is not particularly limited as long as it can create an environment where the microorganisms can survive.

The conductive section is simply required to be provided on at least part of the inner face of the pore with which the electron-donating microorganisms can come into contact, but preferably, it is provided on as many regions of the inner face of the pore as possible (for example, the entire inner face of the pore, or 90% or more of the entire inner face). Preferably, the conduction path can electrically connect as many regions of the surface layer portion to each other as possible (for example, 90% or more of all the pores). The entire surface layer portion or the entire first electrode may serve as a conductive section.

The first electrode is not particularly limited in shape, and it is simply required to comprise a surface layer portion having at least one pore with an opening. The shape of the pore or the shape of the opening is not particularly limited either, and may be any shape. Examples of the shape of the pore include cylindrical, prismatic, spherical, ellipsoidal, or any shape similar to them.

When the first electrode is formed of a combination of a non-conductive material and a conductive material, at least the conduction path that electrically connects the conductive sections is formed of the conductive material. The conductive material may be a metal material, carbon, a semiconductor, or an organic substance.

At least part of the ion-containing liquid surrounding the electron-donating microorganisms is kept inside the pore by interface tension at the interface between the inner face of the pore and the liquid. That is, the size of the pore of the first electrode may be any size that allows for keeping the ion-containing liquid surrounding the electron-donating microorganisms inside the pore by the interface tension. Inside such a pore, the electron-donating microorganisms tend to come into contact with the conductive section on the inner face of the pore more frequently, making it possible to achieve more efficient power generation.

The surface layer portion having the pore preferably includes a light-absorbing material. Using a light-absorbing material makes it possible to efficiently trap microorganisms inside the pore, as described below. Examples of the light-absorbing material include nanoparticles and microparticles of metals, semiconductors, organic substances, and the like. Herein, "light-absorbing" means that the intensity of light that is absorbed by the substance is greater than zero. The wavelength of the light may be within the ultraviolet region or the visible region or the near-infrared region, or may be within two of these three regions combined, or may be within all the three regions combined. The light-absorbing properties may be defined by the range of light absorptivity, for example. The lower limit to the range of absorptivity is not particularly limited as long as it is greater than zero. The upper limit to the range of absorptivity is 100%.

Preferably, the surface layer portion has a plurality of pores, and the plurality of pores are arranged in the surface layer portion with at least a certain level of regularity. Having the microorganisms kept inside the regularly-arranged pores makes it possible to uniformly distribute the microorganisms in the surface layer portion of the electrode. This provides the following advantages: (i) a larger amount of microorganisms kept per unit area; (ii) uniform distribution of the microorganisms; and (iii) uniform fuel supply to the microorganisms. In particular, from the viewpoint of efficiently enhancing the pore density in the surface layer portion, the pores are preferably arranged in a honeycomb shape in the surface layer portion. Herein, "honeycomb shape" refers to a shape formed by a plurality of regular hexagons arranged in a two-dimensional hexagonal lattice (a honeycomb shape), as described in Japanese Patent No. 6375578 (PTL 2) of the inventors of the present invention. Each of the regular hexagons forms a pore, and each pore has an opening with a size from the order of nanometers to the order of micrometers, where each pore may be a through hole or may be a non-through hole. The shape of the pore is not particularly limited, and may include any shape such as cylindrical, prismatic, and spherical except true spherical (such as semispherical or semiellipsoidal, for example). Among all the possible honeycomb shapes, a hexagonal closest packed lattice is particularly preferable.

The electrochemical device according to the present invention encompasses microbial solar cells, microbial fuel cells, microbial electrolytic cells, biosensors, and the like. These electrochemical devices comprise the first electrode as an anode and comprise a second electrode as a cathode, where the second electrode is different from the first electrode. The first electrode includes an ion-containing medium kept inside each pore, and electron-donating microorganisms surrounded by the ion-containing medium. They also comprise, as needed, an electrolytic compartment for accommodating the ion-containing medium serving as an electrolyte solution. However, the electrochemical device according to an embodiment of the present invention is not particularly limited, and it also encompasses, for example, constituent parts of these electrochemical devices. Examples of the constituent parts include probes and sensor members.

Hereinafter, the configuration of a microbial solar cell as a preferable example of an electrochemical device according to the present invention will be described. FIG. 1 is a conceptual view of microbial solar cell 1 according to an embodiment of the present invention. Microbial solar cell 1 comprises an electrolytic compartment 2, an anode 3, and a cathode 4, where anode 3 and cathode 4 are immersed in an electrolyte solution 5 accommodated in electrolytic compartment 2, and, as cathode 4, oxygen (air) is supplied by means of aerating and/or the like. Anode 3 and cathode 4 are electrically connected to an external circuit 6. As anode 3 in such a configuration, the above-described first electrode is used, and inside at least one pore in the surface layer portion of anode 3, electron-donating microorganisms 7 are carried. Preferably, part of electrolytic compartment 2 or each electrode may transmit light having a wavelength capable of causing photosynthesis (sunlight in FIG. 1) to allow it to reach anode 3.

In microbial solar cell 1 of the configuration shown in FIG. 1, a sunlight 8 is received and, on the anode 3 side, the photosynthesis process of electron-donating microorganisms 7 provides an electron ($e^-$) 9 and a proton ($H^+$), and this electron 9 moves through external circuit 6 to the cathode 4 side, where the proton is oxidized by oxygen to produce water ($H_2O$).

In microbial solar cell 1 shown in FIG. 1, a conductor such as carbon and/or metal, for example, is used as cathode 4, and on the surface of cathode 4, a catalyst such as platinum, for example, is supported. Electrolyte solution 5 is not particularly limited, and water can be preferably used.

Although not shown in FIG. 1, it would be obvious that a diaphragm may be provided between anode 3 and cathode 4 to form a twin-compartment microbial solar cell. In this case, as the diaphragm, a proton exchange membrane (PEM) capable of selectively transmitting hydrogen ions is preferably used. As the proton exchange membrane, a polymer electrolyte based on perfluorocarbonsulfonic acid can be used, and specific examples thereof include Nafion (registered trademark, DuPont Inc.). A membrane formed of an organic-inorganic composite compound, namely a composite of a hydrocarbon-based polymer such as polyvinyl alcohol and an inorganic compound such as tungstic acid, may also be used.

As needed, an electron transfer mediating substance, M, may be further added. The electron transfer mediating substance refers to an electron transporter capable of transporting electrons from microorganisms to the electrode, such as, for example, redox mediator compounds, electron mediators, and conductive fine particles.

The redox mediator compound refers to an electron shuttle compound that is mainly produced inside electron-donating microorganisms and then released from the cells. The electron shuttle compound moves back and forth between microorganisms and the electrode, and through its own oxidation and reduction, transports electrons produced by metabolism of the microorganisms to the electrode. Examples thereof include phenazine-1-carboxamide, pyocyanin, and 2-amino-3-carboxy-1,4-naphthoquinone (ACNQ).

The electron mediator refers to an artificially-synthesized redox compound having a similar function to that of a redox mediator compound. Examples thereof include neutral red, safranin, phenazine ethosulfate, thionine, methylene blue, toluidine blue, phenothiazine, resorufin, gallocyanine, 2-hydroxy-1,4-naphthoquinone (HNQ), and porphyrin.

The conductive fine particles refer to metal or semiconductor fine particles capable of binding to electron-donating microorganisms, extracting electrons from the microorganisms, and then transferring the electrons to the electrode, and examples thereof include iron oxide, iron sulfide, and manganese oxide.

Figure 2:
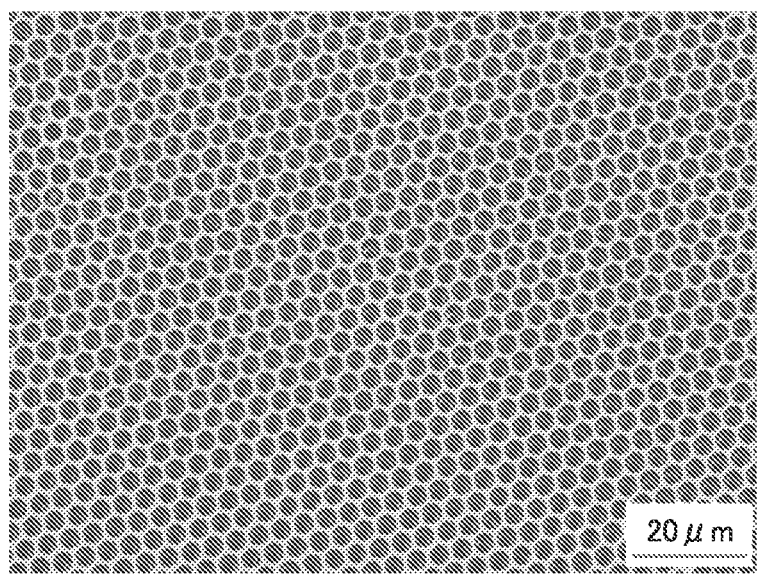
FIG. 2 shows a planar image of an example of a first electrode in an electrochemical device according to the present invention (FIG. 2(a)) and an enlarged cross-sectional image thereof (FIG. 2(b)).
Figure 2:
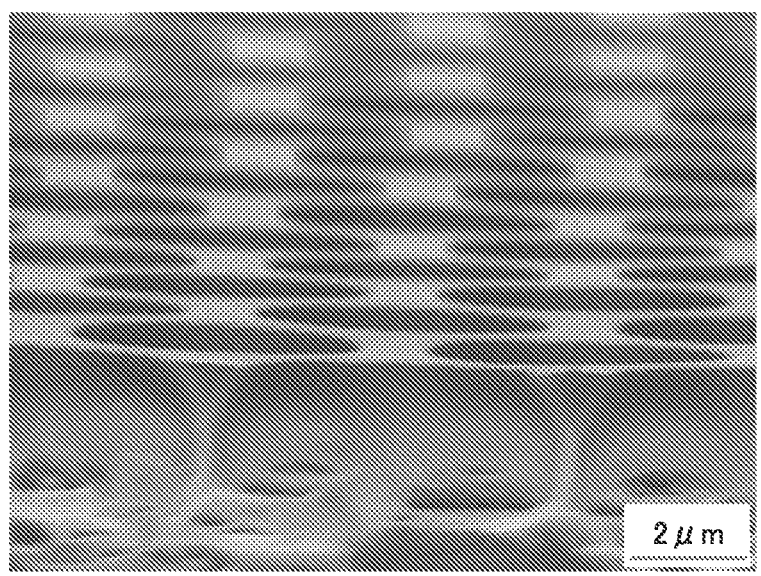

Here, FIG. 2(a) is a planar image of an example of the first electrode (used as anode 3 in FIG. 1) in the electrochemical device according to the present invention, and FIG. 2(b) is an enlarged cross-sectional image thereof. In the electrochemical device according to the present invention, it is preferable that the surface layer portion of the first electrode have a plurality of pores arranged in a honeycomb shape as shown in FIG. 2(a), but it would be obvious that the pattern of arrangement of the plurality of pores is not limited to the above shape. In FIG. 2(b), the inner face of the pore is spherical, but this is not limitative. Adjacent pores may be connected inside the surface layer portion of the electrode, or each pore may be independent of each other surrounded by interior walls.

When the inner face of the pore is spherical as shown in FIG. 2(b), electron-donating microorganisms that have once trapped inside the pore can move only in the direction along the spherical inner face and thereby are not likely to be released to the outside the pore. It has already been made clear that electron-donating microorganisms once trapped inside a pore, even after they are brought into contact with electrolyte solution and used as an electrochemical device, would remain inside the pore for an extended period of time.

Each pore has an opening that allows for entering of electron-donating microorganisms into the pore. The size of the pore may be any size that allows for keeping the liquid containing electron-donating microorganisms inside the pore by interface tension at the interface between the inner face of the pore and the liquid. The shape of the electron-donating microorganisms carried inside each pore may be either spherical (cocci) or rod-like (bacilli).

Figure 3:
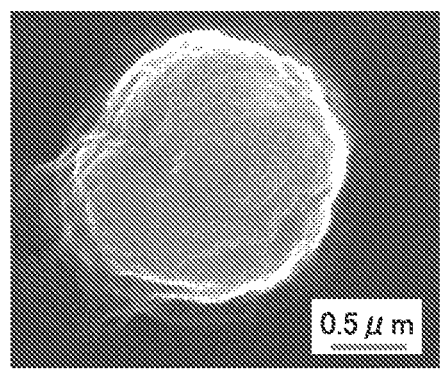
FIG. 3 shows an SEM image (FIG. 3(a)) and a stereo micrograph (FIG. 3(b)) of *Synechocystis* sp. of Cyanobacteria.
Figure 3:
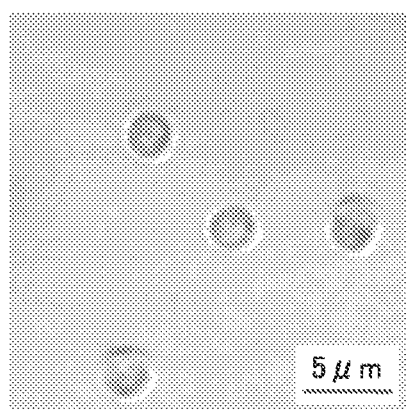
Figure 4:
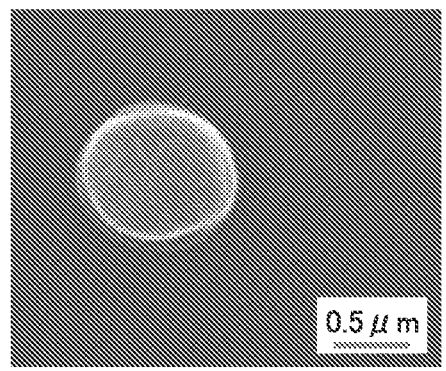
FIG. 4 shows an SEM image (FIG. 4(a)) and a stereo micrograph (FIG. 4(b)) of *Synechococcus* sp. of Cyanobacteria.
Figure 4:
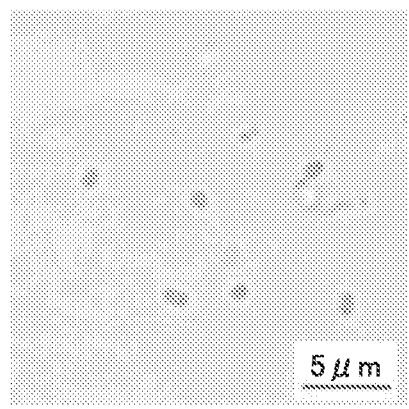

As described above, in the electrochemical device according to the present invention, the electron-donating microorganisms carried inside each pore are: (1) electron-donating microorganisms of different classifications or different electron-donating microorganisms of the same classification (for the first electrochemical device); and/or (2) electron-donating microorganisms with average particle sizes significantly different from each other (for the second electrochemical device). FIG. 3 shows an SEM image (20000 times) (FIG. 3(a)) and a stereo micrograph (400 times) (FIG. 3(b)) of Synechocystis sp. of Cyanobacteria, and FIG. 4 shows an SEM image (20000 times) (FIG. 4(a)) and a stereo micrograph (400 times) (FIG. 4(b)) of Synechococcus sp. of Cyanobacteria. Synechocystis is of a different family or species from Synechococcus, and measurement of the average particle sizes of 100 sample cells with a stereomicroscope revealed that the average particle size of Synechococcus was $1.32 \pm 0.13$ μm while the average particle size of Synechocystis was $2.74 \pm 0.24$ μm, which means that their particle sizes are different from each other by 10% or more. Thus, it can be said that Synechocystis and Synechococcus are different electron-donating microorganisms (different in family or species) within the same classification (see Komarek, J., Kastovsky, J., Mares, J. & Johansen, J. R. (2014). "Taxonomic classification of cyanoprokaryotes (cyanobacterial genera) 2014, using a polyphasic approach". Preslia 86: 295-335) and also have average particle sizes significantly different from each other, and therefore this combination corresponds to a case where the above (1) and (2) are satisfied at the same time.

Figure 5:
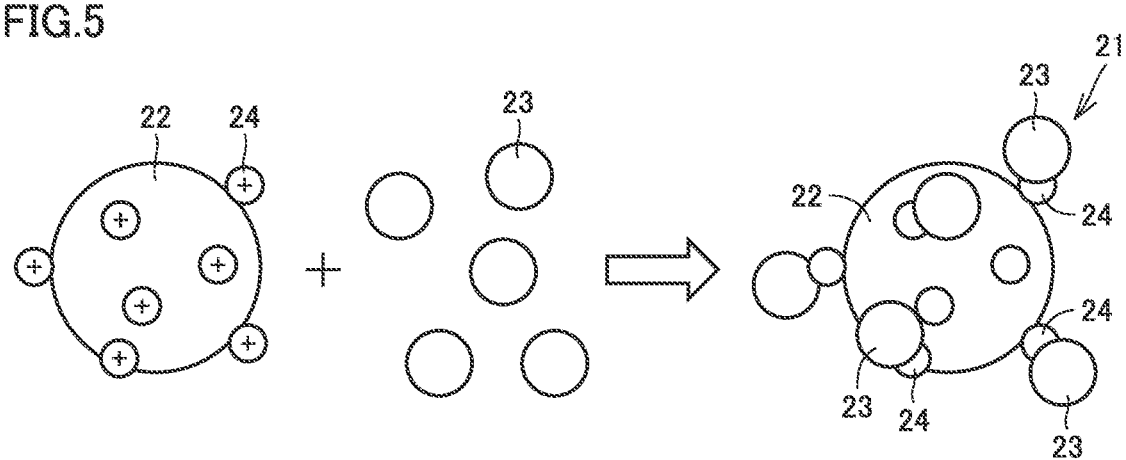
FIG. 5 schematically illustrates a composite 21 of electron-donating microorganisms 22, 23 and magnetic nanoparticles 24 that may be preferably used in an electrochemical device according to the present invention.
Figure 6:
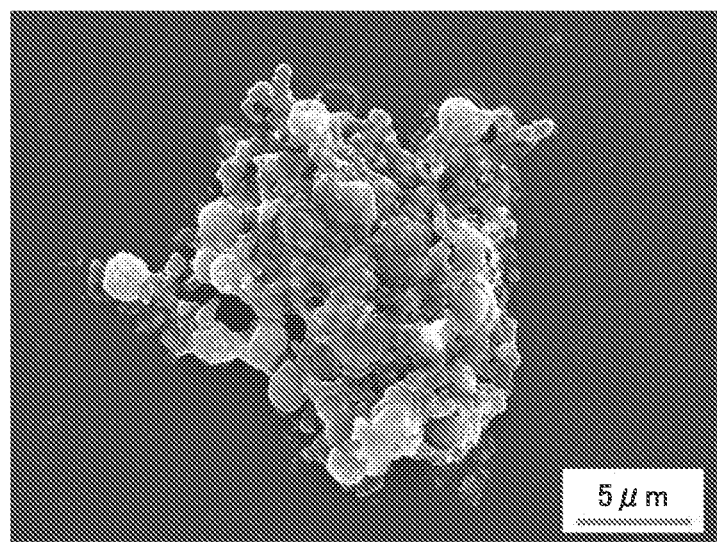
FIG. 6 is an SEM image of a composite of electron-donating microorganisms and magnetic nanoparticles prepared in Experiment Example.

FIG. 5 schematically illustrates composite 21 of electron-donating microorganisms 22, 23 and magnetic nanoparticles 24 that may be preferably used in an electrochemical device according to the present invention. FIG. 6 is an SEM image of a composite prepared in Experiment Example described below. In the electrochemical device according to the present invention, the electron-donating microorganisms may be negatively charged, and electron-donating microorganisms 22, 23 may be bonded to each other via positively-charged magnetic nanoparticles to form composite 21. In an example shown in FIG. 5, both the electron-donating microorganisms 22, 23 are negatively charged (the zeta potential is −11 mV when electron-donating microorganism 22 with larger average particle size is Synechocystis, and the zeta potential is −21 mV when electron-donating microorganisms 23 with smaller average particle size are Synechococcus), and a plurality of positively-charged magnetic nanoparticles are electrostatically bonded to the surface of electron-donating microorganism 22 with larger average particle size. To the plurality of magnetic nanoparticles 24 that are electrostatically bonded to the surface of electron-donating microorganism 22, electron-donating microorganisms 23 with smaller average particle size are electrostatically bonded, and thereby composite 21 is formed which includes a plurality of electron-donating microorganisms 23 bonded to a single electron-donating microorganism 22 via magnetic nanoparticles 24.

Figure 7:
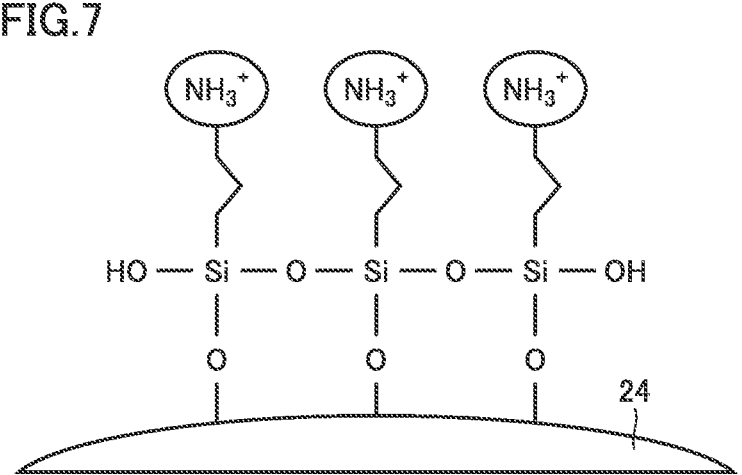
FIG. 7 schematically illustrates the surface of positively-charged magnetic nanoparticle 24.

As the material of the magnetic nanoparticles, magnetite, hematite, cobalt, ferroplatinum, and/or the like is used, and among these, magnetite is preferred because it is made from inexpensive raw material and can be synthesized in large quantity. Here, FIG. 7 schematically illustrates the surface of positively-charged magnetic nanoparticle 24. Shown in FIG. 7 is a surface of magnetite (magnetic nanoparticle) to which positive charges ($NH_3^+$) are attached by silane coupling. Magnetite has a zeta potential of about +15 mV, and after silane coupling treatment, its zeta potential changes to about +24 to 54 mV.

Figure 8:
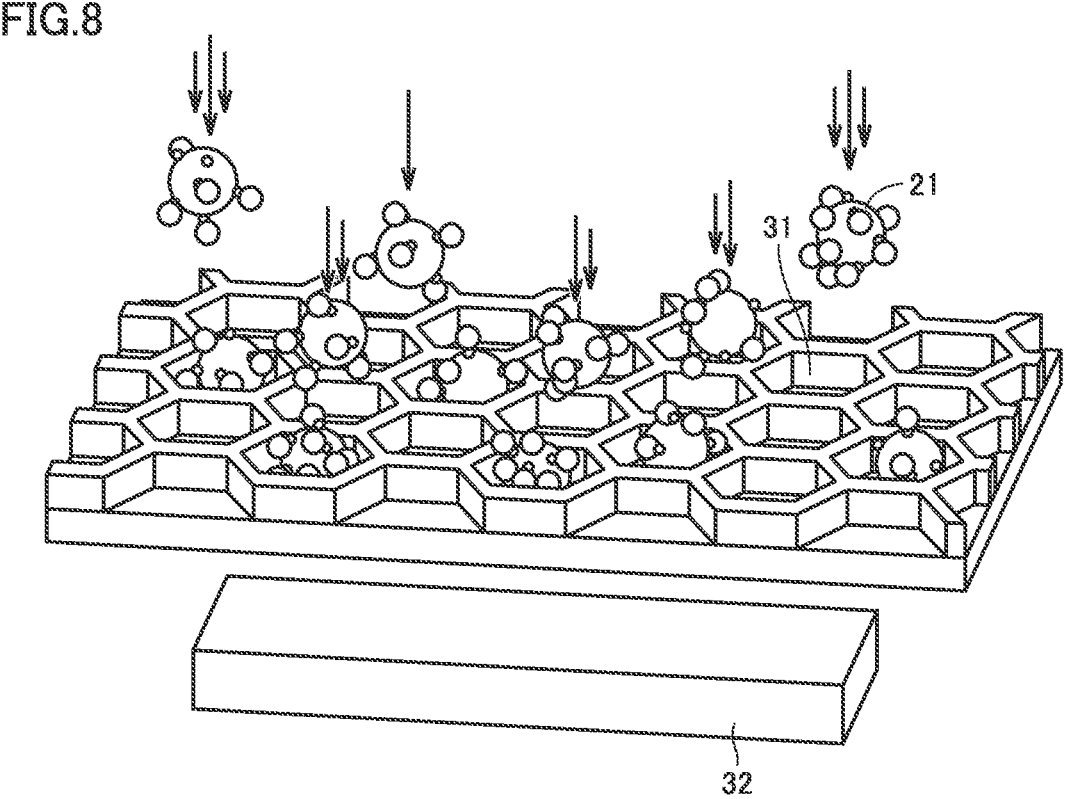
FIG. 8 schematically illustrates trapping into pores when composite 21 shown in FIG. 6 is used.

FIG. 8 schematically illustrates trapping into pores when composite 21 as shown in FIG. 5 is used. Because it includes magnetic nanoparticles 24, using composite 21 as shown in FIG. 5 makes it possible to trap composite 21 into a pore 31 by magnetic force by using a magnet 32, as described below. As magnet 32, a neodymium magnet and/or an electromagnet, for example, may be preferably used, but it is obvious that this is not limitative.

[2] Method of Producing Electrochemical Device

A method of producing an electrochemical device according to the present invention comprises: preparing an electrode comprising a surface layer portion having at least one pore with an opening, wherein the pore has a conductive section at least on an inner face thereof, and the electrode comprises a conduction path that electrically connects the conductive sections of the pores to each other; and making each pore carry electron-donating microorganisms inside thereof (the above "first production method" and the above "second production method" are collectively called "the method of producing an electrochemical device according to the present invention").

The first production method is characterized in that the electron-donating microorganisms made to be carried inside each pore are electron-donating microorganisms of different classifications or different electron-donating microorganisms of the same classification. This first production method is a method for producing the above-described first electrochemical device, and the definition of the terms such as "electron-donating microorganisms of different classifications" and "different electron-donating microorganisms of the same classification" is the same as described above for the first electrochemical device.

The second production method is characterized in that the electron-donating microorganisms made to be carried inside each pore are electron-donating microorganisms with average particle sizes significantly different from each other. This second production method is a method for producing the above-described second electrochemical device, and the definition of the terms such as "average particle size" and "average particle sizes significantly different from each other" is the same as described above for the second electrochemical device.

In the method of producing an electrochemical device according to the present invention, the step of preparing an electrode can be carried out as described below, for example.

First, a thin-film-forming material is dissolved in a hydrophobic organic solvent to prepare a liquid composition, and thereby a liquid film of the liquid composition is formed. The liquid film of the liquid composition may be formed on a support. Examples of the support include glass, metal, carbon material, silicon material, and polymer material. As the polymer material, depending on the application, polyethylene naphthalate, polyethylene terephthalate, polypropylene with excellent flexibility can be used, for example.

Then, droplets of an aqueous solvent are deposited on the liquid film. As the aqueous solvent, water is preferable. For example, high-moisture air may be sprayed to the liquid film. The high-moisture air preferably has a relative moisture content from 50 to 95%. When the organic solvent evaporates from the liquid film of the liquid composition, latent heat is lost from the surface of the liquid film. This causes a temperature decrease in the surface of the liquid film, causing condensation of water vapor in the high-moisture air into fine water droplets, which adhere to the surface of the liquid film. At this time, surface tension between the organic solvent and water acts to minimize the interface between them, and because of this, the water droplets aggregate with each other and grow.

Preferably, to the liquid composition, an amphiphilic compound and/or a surfactant may be added that has an affinity for both the organic solvent and the aqueous solvent. By the action of the amphiphilic compound and/or the surfactant in the liquid composition, the organic solvent (the liquid composition) is allowed to be stably present around the water droplets. Hence, the water droplets become trapped into the liquid film, and for minimizing their surface areas, become spherical within the liquid film. Further, due to lateral capillary action, the water droplets are packed as closely to each other as possible along the surface of the liquid film, growing in a honeycomb-shape arrangement. From this state, evaporation of the organic solvent further proceeds, and at the point where the concentration of the thin-film-forming material in the liquid composition reaches a certain value, the thin-film component starts to precipitate and the arrangement of the water droplets is fixed.

Subsequently, after the water droplets evaporate, pores in honeycomb-shape arrangement are left, together with a frame made of the thin-film component surrounding the pores, and thereby an electrode precursor may be obtained that has a surface layer portion in which pores with an opening are arranged in a honeycomb shape. The honeycomb-shape arrangement grows spontaneously due to interface tension and/or natural convection, which is therefore called self-organization, and is known to form a very uniform and orderly structure.

As the thin-film-forming material, a polymer material or a raw material thereof is preferably used. Specific examples thereof include aliphatic polyesters such as polylactic acid, polyhydroxybutyric acid, polycaprolactone, polyethylene adipate, and polybutylene adipate; polyacrylic acid esters such as polymethyl methacrylate and polytetrahydrofurfuryl methacrylate; aliphatic polycarbonates such as polybutylene carbonate and polyethylene carbonate; polyimides such as polyimide, polyamide-imide, polyether imide, and polyester imide; and polystyrenes. Two or more of these may be used as a polymer mix.

As the thin-film-forming material, monomer materials may be used, which may be polymerized after liquid film formation. In this case, monomer compounds that may be polymerized for obtaining the above-described polymer material can be selected and used as appropriate. Furthermore, a combination of a polymer material and a monomer material and/or an oligomer material and/or a polyion and/or the like may be used. Moreover, a crosslinking agent, a catalyst, and/or the like may also be used.

The hydrophobic organic solvent is not particularly limited as long as it does not dissolve in the aqueous solvent. Specific examples thereof include halogen-based organic solvents such as chloroform and methylene chloride; aromatic hydrocarbons such as benzene, toluene, and xylene; esters such as ethyl acetate and butyl acetate; water-insoluble ketones such as methyl isobutyl ketone; and ethers such as diethyl ether. Moreover, a solvent such as carbon disulfide may also be used.

The amphiphilic compound is not particularly limited, and examples thereof include amphiphilic polymers having polyacrylamide as its main chain, a dodecyl group as a hydrophobic side chain, and a carboxyl group as a hydrophilic side chain, as well as polyethyleneglycol-polypropyleneglycol block copolymers.

The hydrophobic side chain is a nonpolar linear group such as a methylene group or a phenylene group, and preferably, its structure is free of a branched hydrophilic group such as a polar group or an ion-dissociative group across the entire stretch except a linking group such as an ester group or an amido group. For example, when a methylene group is used, it preferably consists of more than five units. The hydrophilic side chain preferably has a structure which has a terminal hydrophilic moiety such as a polar group, an ion-dissociative group, or an oxyethylene group via a linking moiety such as a methylene group. Particularly preferably, a compound having dimethyldistearylammonium bromide as a hydrophilic group component and sodium polystyrene sulfonate as a hydrophobic group component, in a polyion complex form, is used.

As the surfactant, an anionic surfactant, a cationic surfactant, a nonionic surfactant, an amphoteric surfactant, and/or the like, all of which are generally known, can be used. Among these, hexadecyltrimethylammonium bromide (CTAB) is preferable.

The height of the interior wall of the pore is preferably greater than the length of the minor axis of the electron-donating microorganisms (or the diameter, for cocci). However, it is not particularly limited as long as it allows for capturing at least one electron-donating microorganism. More specifically, the height of the interior wall of the pore is, for example, from 0.5 μm to 500 μm, preferably from 2 μm to 100 μm, more preferably from 2 μm to 50 μm, further preferably from 2 μm to 10 μm. The diameter of the pore (the diameter in the horizontal direction) is not particularly limited, but is preferably from 0.5 μm to 500 μm, more preferably from 2 μm to 50 μm, further preferably from 2 μm to 10 μm. Preferably, in each pore in the surface layer portion of the first electrode, two or more, preferably ten or more electron-donating microorganisms are trapped (which at least include electron-donating microorganisms of different classifications, or different electron-donating microorganisms of the same classification, or electron-donating microorganisms with average particle sizes significantly different from each other).

Next, the electrode precursor is provided with a conductive section on the inner face of each pore as well as with a conduction path that electrically connects the conductive sections to each other, and thereby a first electrode is formed. More specifically, the conductive sections and the conduction path may be formed by, for example, forming a conductive coating all over the surface layer portion of the electrode precursor, including over the inner faces of the pores. Doping with conductive fine particles to the surface layer portion of the electrode precursor may also be adopted. Alternatively, conductive fine particles may be mixed in the thin-film-forming material in advance to impart conductivity to the entire electrode precursor.

As the method for forming the conductive coating, a known method such as sputtering, vapor deposition, electroplating, electroless plating, spraying, and/or spin coating can be employed. Among these, sputtering is preferable because it can form a thin, uniform conductive coating. As the material for forming the conductive coating, oxide of a metal such as gold, platinum, silver, copper, titanium, nickel, zinc, carbon, and/or ITO is preferable, and that of gold is particularly preferable.

Next, the method for trapping the microorganisms inside the pores in the surface layer portion of the first electrode is described.

When composite 21 as shown in FIG. 5 is used that includes negatively-charged electron-donating microorganisms bonded to each other via positively-charged magnetic nanoparticles, magnet 32 may be positioned near a side of the electrode opposite to the pore-containing surface layer portion side, as shown in FIG. 8, to attract the entire composite including the magnetic nanoparticles by means of magnetic force to make it trapped inside the pores. When trapping is performed in this way, as compared to trapping by means of convection as described below which involves single-point laser light irradiation, electron-donating microorganisms can be trapped in a relatively short time, which is advantageous.

When the composite as shown in FIG. 5 is not used, a conventional method may be employed where convection is generated in the liquid to move and trap electron-donating microorganisms into the pores. The method for generating convection in the liquid is not particularly limited, and examples thereof include a method involving circulating the liquid with a pump, a method involving sucking and ejecting the liquid with the use of a nozzle and/or the like (pipetting), and a method involving shaking the liquid. A method involving electrophoresis and/or dielectrophoresis may also be employed. For example, by utilizing the behavior of electron-donating microorganisms to align parallel to the direction of the electric field, it is possible to control the direction in which the electron-donating microorganisms move, by changing the electric field, so as to drive the electron-donating microorganisms into a stable region in an electromagnetic potential.

It is also possible to use light and/or heat to generate electromagnetic force and/or convection in the liquid. The optical tweezer technique, which is a technique that takes advantage of the fact that light is an electromagnetic wave and thereby traps a very small object by means of electromagnetic force, may be used to trap electron-donating microorganisms at a desired position. When the surface layer portion includes a light-absorbing material, the surface layer portion of the first electrode may be irradiated with laser light to generate a temperature gradient in the liquid by means of photothermal conversion effect and thereby effectively generate convection. Generally, temperature increases at the point irradiated with laser light and in the surrounding area. In contrast, when heat is applied to the upper parts of the walls in the honeycomb-shaped electrode with a light-absorbing film formed for the surface layer portion, the temperature increases only locally at a small area. As a result, convection may be effectively generated and the influence of heat on the electron-donating microorganisms may be reduced or suppressed in most areas on the electrode, making it possible to trap the electron-donating microorganisms while maintaining their function.

When the surface layer portion of the first electrode is irradiated with laser light, it is preferable that only a limited, very small area be irradiated with the light. More specifically, irradiation focus (laser spot) may be directed to the wall portion between adjacent pores, not the pore portions in which the electron-donating microorganisms are kept. The laser light applied to the wall portion between the pores is converted into heat in this portion, and thereby fine air bubbles are formed, which causes a local temperature increase. This gives rise to a temperature difference in the liquid, generating convection around the laser spot, which transports the electron-donating microorganisms from outside to inside the nearby pores. This convection also acts to keep the electron-donating microorganisms once trapped inside the pore, to remain trapped inside the pore. Since the electron-donating microorganisms trapped inside the pore can only move in one direction due to their chemotaxis, they remain trapped even after the laser light irradiation is stopped.

Figure 9:
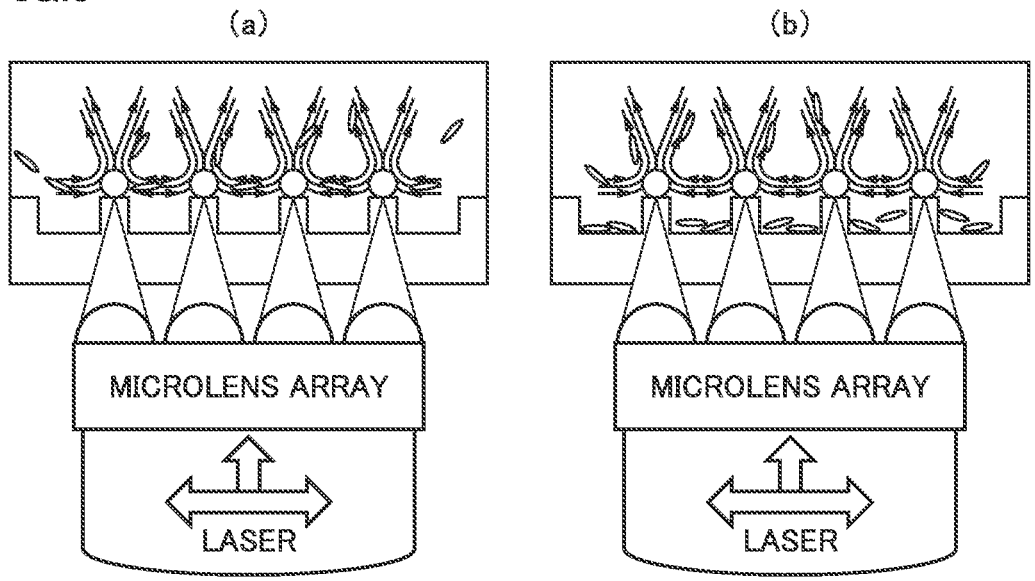
FIG. 9 illustrates (a) a process of using a microlens array to generate convection in liquid and (b) a process of trapping microorganisms.

It is also possible to irradiate the surface layer portion of the electrode with a plurality of multibranched laser lights to generate convection at a plurality of positions in the liquid. More specifically, a microlens array may be used to branch laser light, and thereby many wall members may be irradiated at the same time with one-time laser light irradiation. FIG. 9(*a*) shows that laser lights produced by branching through a microlens array are applied to a plurality of wall members and thereby a plurality of fine air bubbles are formed. By this, at a plurality of positions in the surface layer portion, convection is generated in the liquid. FIG. 9(b) shows that the convection drives the electron-donating microorganisms to move and the plurality of electron-donating microorganisms are trapped at the same time into a plurality of pores. Use of a microlens array greatly enhances the efficiency of the process of trapping the electron-donating microorganisms inside the pores.

As the laser light, a light with a wavelength from 200 nm to 2000 nm (in air or water; the same applies hereinafter) can be used. In particular, by selecting the material of the surface layer portion of the first electrode, the shape of the pore, the wavelength of the laser light, and/or the like in such a manner that they satisfy localized surface plasmon resonance conditions, a remarkable photothermal conversion effect can be obtained. For example, when laser light with a wavelength from 400 nm to 800 nm is applied to nano-sized metal particles, localized surface plasmon resonance occurs. A gold-leaf conductive coating formed by sputtering, which is formed of accumulated nano-sized fine metal particles of several dozen nanometers, tends to exhibit photothermal conversion effect. Also preferable are highly light-absorbing materials close to a black body (such as carbon nanotube black body, metal-nanoparticle-immobilized beads, and the like, for example).

As to be described below in Experiment Example section, the density of electron-donating microorganisms trapped inside pores when multipoint laser light irradiation was adopted was compared to the density when magnetic force was used with the use of composite 21 described above, and as a result, the multipoint laser light irradiation demonstrated a higher density in trapping electron-donating microorganisms inside pores.

In the following, a more specific illustration of the present invention is provided with reference to Experiment Examples, but these Experiment Examples are not intended to limit the scope of the present invention. In Experiment Examples, an electrode in which pores with spherical inner faces are arranged in a honeycomb shape is also called "a honeycomb thin film".

EXPERIMENT EXAMPLES (Preparing Raw Material Solution)

64.5 mg of sodium polystyrene sulfonate was dissolved in 50 mL of ultrapure water, and the resulting solution was stirred until it became transparent. Also, 200 mg of dimethyldistearylammonium bromide was dissolved in 100 mL of ultrapure water, and the resulting solution was stirred while heating to 70 to 80° C. until it became translucent.

Then, while the dimethyldistearylammonium bromide solution was being stirred and maintained the temperature thereof, the sodium polystyrene sulfonate solution was added to the dimethyldistearylammonium bromide solution, followed by stirring for another 20 minutes. The resulting colloidal polyion complex (PIC) precipitate was suction-filtered. The suction-filtered PIC was dried in a vacuum desiccator. Subsequently, 12.5 mg of polystyrene and 2.5 mg of the PIC were mixed with 10 mL of chloroform, and the resulting mixed solution was vigorously mixed for 5 minutes to prepare a raw material solution.

(Preparing Honeycomb Thin Film)

Onto a glass support of 24 mm×60 mm×0.15 mm, 450 µL of the raw material solution was added dropwise. Air with a relative humidity from 50 to 70% was sprayed with the use of an air pump at a rate of 90 mL/min, followed by air drying to prepare a honeycomb thin film.

FIG. 2(a) is a planar image of the honeycomb thin film thus obtained, and FIG. 2(b) is an enlarged cross-sectional image thereof. The diameter of the openings of the pores was 5.0 µm and the depth thereof was 3.0 µm, with a standard deviation for the diameter of the openings being 0.1 µm or less, indicating that a honeycomb thin film with highly uniform pores was obtained. The thickness of the honeycomb thin film was 3 µm. From the enlarged cross-sectional image of the honeycomb thin film (FIG. 2(b)), it was observed that the pores had spherical inner faces. The adjacent pores were connected to each other via through holes located near the middle point in the thickness direction of the honeycomb thin film.

(Forming Conductive Coating)

A sputtering apparatus manufactured by Hitachi High-Technologies Corporation (an ion sputter, MC1000) and Au target (03E-4233) were used to perform gold sputtering treatment to the honeycomb thin film, and thereby a first electrode was prepared.

Elemental analysis was performed on the gold-sputtered honeycomb thin film (the first electrode) with the use of an X-ray elemental analysis apparatus manufactured by Hitachi High-Technologies Corporation (SwiftED3000 equipped with TM3000), and a peak attributable to gold atoms was observed. This peak was observed for the top surface part of the honeycomb thin film as well as the bottom surface, the wall surface, and the like of the pores, indicating that conductive sections were formed in the pores and a conduction path was also formed that electrically connected the conductive sections. The thickness of the gold coating was 45 nm.

(Preparing Positively-Charged Magnetic Nanoparticles)

4.32 g of FeCl$_3$·6H$_2$O and 1.59 g of FeCl$_2$·4H$_2$O were weighted (2:1 in mol ratio), which were dissolved in 80 mL of deionized water and then heated to 80° C. with stirring, followed by addition of 10 mL of 28% aqueous ammonia solution and reaction in the below described manner to give magnetite (Fe$_3$O$_4$) as magnetic nanoparticles. The zeta potential of the resulting magnetite was measured to be +15.04 mV, with the use of a zeta potential measurement apparatus (ELSZ-DN2) manufactured by Otsuka Electronics Co., Ltd.

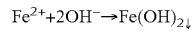

$Fe^{2+} + 2OH^- \rightarrow Fe(OH)_2\downarrow$

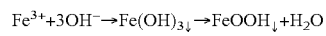

$Fe^{3+} + 3OH^- \rightarrow Fe(OH)_3\downarrow \rightarrow FeOOH\downarrow + H_2O$

$Fe(OH)_2\downarrow + 2FeOOH\downarrow \rightarrow Fe_3O_4\downarrow + 2H_2O$

Subsequently, 1 to 3 mL of 3-aminopropyltriethoxysilane was added, followed by 90 minutes of heating and stirring to allow silane coupling treatment to proceed (all heating was performed at 80° C.). After drying, the resultant was dispersed in deionized water to achieve 10 mg/mL, and thereby, positively-charged magnetic nanoparticles as schematically shown in FIG. 7 were obtained. These positively-charged magnetic nanoparticles had an average particle size of 12.4 nm and a zeta potential from +24 to 54 mV.

(Preparing Electron-Donating Microorganisms)

*Synechocystis* sp. (provided by the Microbial Culture Collection at the National Institute for Environmental Studies) and *Synechococcus* sp. (provided by the Microbial Culture Collection at the National Institute for Environmental Studies) were concentrated to prepare an OD8 dispersion and an OD10 dispersion of *Synechocystis* as well as an OD2 dispersion and an OD10 dispersion of *Synechococcus*. As the dispersion medium, phosphate buffer was used. The measured value of zeta potential of the electron-donating microorganisms was −11 mV for *Synechocystis* and −21 mV for *Synechococcus*.

(Preparing Composite)

A 100-mM p-benzoquinone solution and a 10 mg/mL positively-charged magnetic nanoparticle dispersion (dispersion medium, ultrapure water) were prepared. Each of the OD10 *Synechocystis* dispersion, the OD8 *Synechocystis* dispersion, and the OD10 *Synechococcus* dispersion was added into two microtubes, each in an amount of 1 mL. To each of the OD8 *Synechocystis* dispersions, 5 μL of the positively-charged magnetic nanoparticle dispersion was added, followed by stirring and 5 minutes of centrifugation in a CHIBITAN-R (manufactured by Tokyo Garasu Kikai Co., Ltd.). The supernatant was replaced by the same amount of the OD2 *Synechococcus* dispersion, followed by adding 10 μL of the p-benzoquinone solution and stirring thoroughly to prepare a bacterial mixed solution. To each of the OD10 *Synechocystis* dispersion tubes and the OD10 *Synechococcus* dispersion tubes, 5 μL of the positively-charged magnetic nanoparticle dispersion and 10 μL of the p-benzoquinone solution were added, followed by stirring thoroughly. In this way, a composite as shown in FIG. 5 was prepared in which the electron-donating microorganisms were negatively charged and *Synechocystis* and *Synechococcus* were bonded to each other via the positively-charged magnetic nanoparticles. FIG. 6 is an SEM image (400 times) of the composite thus obtained.

Comparative Experiment 1

Each of the following samples was prepared.
Sample 1: *Synechococcus* alone
Sample 2: *Synechococcus* mixed with positively-charged magnetic nanoparticles
Sample 3: *Synechocystis* alone
Sample 4: *Synechocystis* mixed with positively-charged magnetic nanoparticles
Sample 5: Composite (*Synechocystis*-(positively-charged magnetic nanoparticles)-*Synechococcus*)
Sample 6: *Synechocystis* mixed with *Synechococcus*

Figure 10:
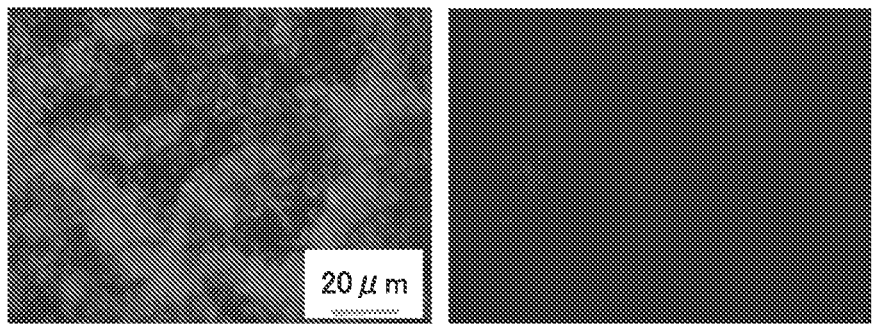
FIG. 10 shows results of Comparative Experiment 1, with FIG. 10(a) showing results for *Synechococcus* (Sample 1 on the left, and Sample 2 on the right), FIG. 10(b) showing results for *Synechocystis* (Sample 3 on the left, and Sample 4 on the right), and FIG. 10(c) showing results for *Synechococcus* and *Synechocystis* (Sample 5 on the left, and Sample 6 on the right), all in the form of fluorescence micrograph.
Figure 10:
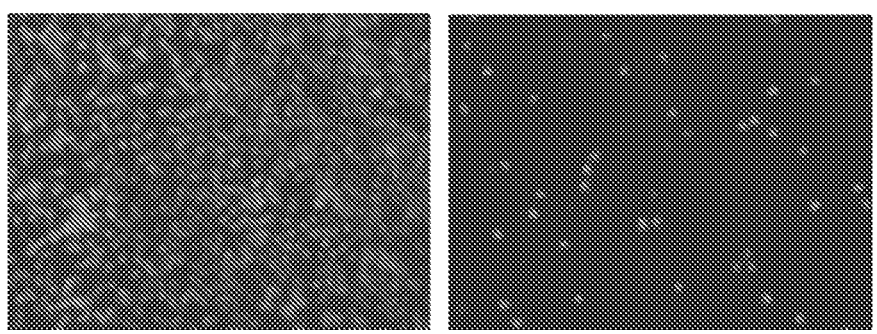
Figure 10:
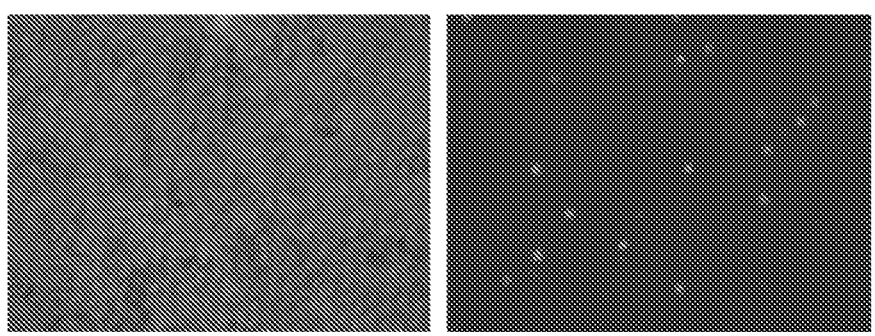

For each of these samples, trapping into the pores in the honeycomb thin film was allowed to proceed with the use of magnetic force with a neodymium magnet, as shown in FIG. 8. FIG. 10 shows results of Comparative Experiment 1, with FIG. 10(a) showing results for *Synechococcus* (Sample 1 on the left, and Sample 2 on the right), FIG. 10(b) showing results for *Synechocystis* (Sample 3 on the left, and Sample 4 on the right), and FIG. 10(c) showing results for *Synechococcus* and *Synechocystis* (Sample 5 on the left, and Sample 6 on the right), all in the form of fluorescence micrograph (100 times). Referring to FIG. 10, use of the composite (*Synechocystis*-(positively-charged magnetic nanoparticles)-*Synechococcus*) allowed for trapping *Synechocystis* and *Synechococcus* into the pores in the honeycomb thin film with a high density with the use of magnetic force.

Comparative Experiment 2

(Assembling Anode Electrode Evaluation Cell)

Figure 11:
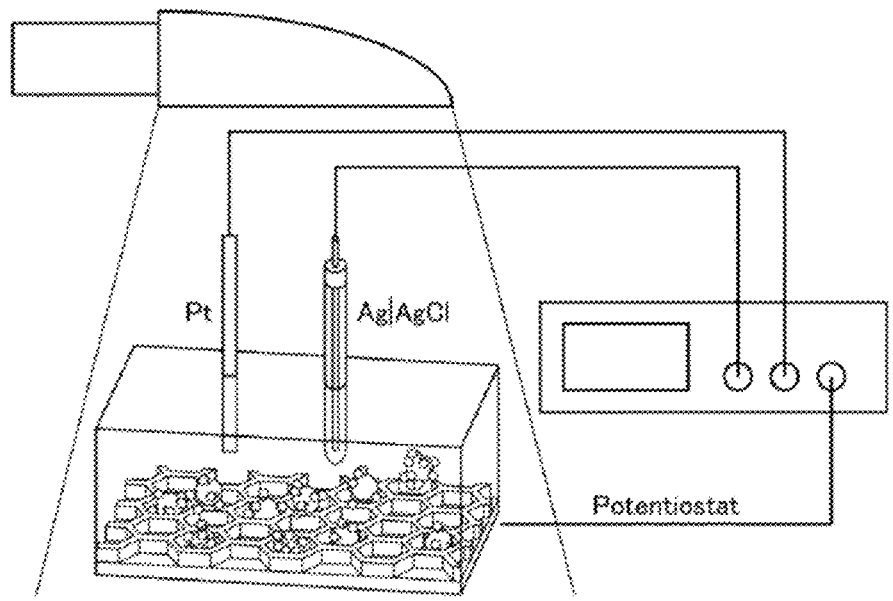
FIG. 11 shows an anode electrode evaluation cell used in Comparative Experiment 2, with FIG. 11(a) showing a conceptual view thereof and FIG. 11(b) showing a photograph thereof.
Figure 11:
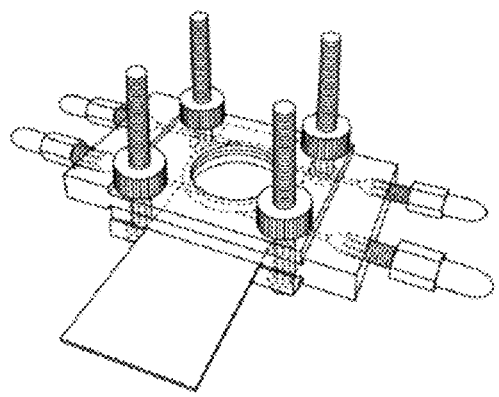

FIG. 11 shows an anode electrode evaluation cell used in Comparative Experiment 2, with FIG. 11(a) showing a conceptual view thereof and FIG. 11(b) showing a photograph thereof. The first electrode with a glass support was held between an upper cell member and a lower cell member both made of polytetrafluoroethylene, and thereby an anode electrode evaluation cell (a cell for evaluating anode electrode) was assembled. The upper cell member was provided with a cylindrical through hole with a diameter of 2.0 mm, and the surface layer portion of the first electrode (an anode) was exposed toward the bottom face of the through hole. The space defined by the through hole and the surface layer portion of the first electrode (an anode) is an electrolytic compartment. The electrolytic compartment was 3.14 cm$^2$ in bottom area, 7.0 mm in depth, and 2.0 mL in volume. Into the electrolytic compartment, a platinum (Pt) wire counter electrode and an Ag/AgCl (saturated KCl solution) reference electrode were inserted. The three electrodes, namely the first electrode (an anode) as the bottom face of the electrolytic compartment, the counter electrode, and the reference electrode were connected to a potentiostat (ALS-830C, manufactured by BAS Inc.). 2 mL of the dispersion of the composite (*Synechocystis*-(positively-charged magnetic nanoparticles)-*Synechococcus*) was injected into the first electrode, followed by voltage application of 0.6 V, and then artificial sunlight irradiation of 1000 W/m$^2$ at intervals of 30 seconds to measure the current. For comparison, the same procedure was carried out for *Synechococcus* alone and *Synechocystis* alone. In addition, the dependence of current density on light intensity was also investigated by changing the intensity of the light irradiation (light intensity) between 50, 100, 500, and 1000 W/m$^2$.

Figure 12:
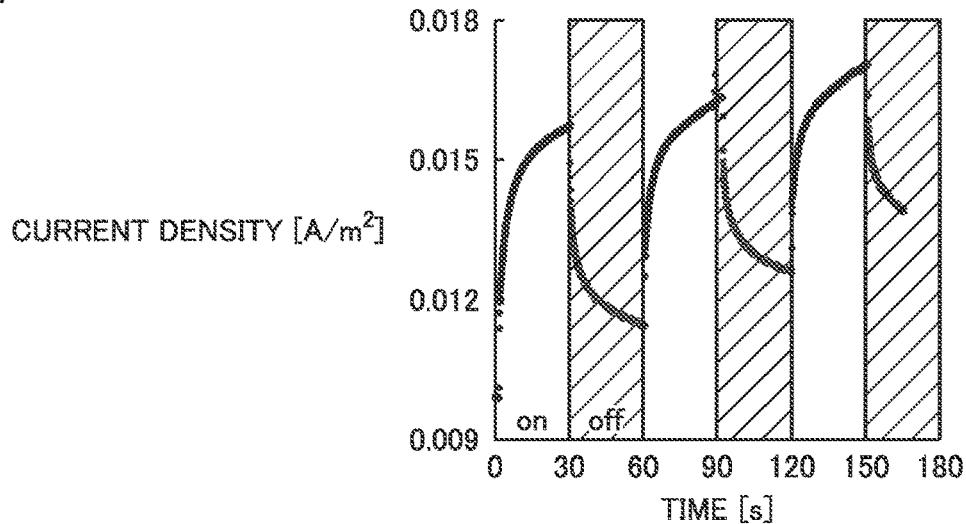
FIG. 12 shows graphs of results regarding responsivity of current density to artificial sunlight in Comparative Experiment 2, with FIG. 12(a) showing results for *Synechococcus* alone, FIG. 12(b) for *Synechocystis* alone, and FIG. 12(c) for the composite.
Figure 12:
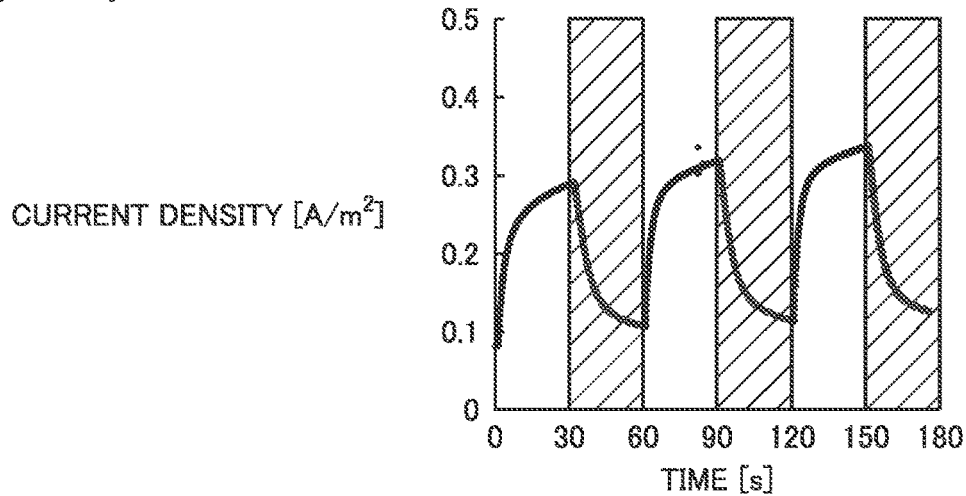
Figure 12:
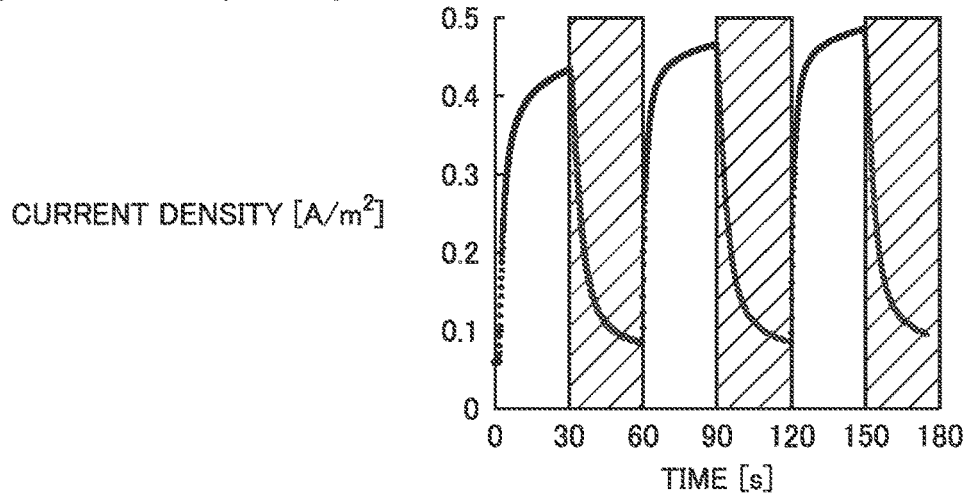

FIG. 12 shows graphs of results regarding responsivity of current density to artificial sunlight in Comparative Experiment 2, with FIG. 12(a) showing results for *Synechococcus* alone, FIG. 12(b) for *Synechocystis* alone, and FIG. 12(c) for the composite, in each of which the vertical axis represents current density (A/m$^2$) and the horizontal axis represents time (s). As shown in FIGS. 12(a), 12(b), 12(c), in each of the above cases, sensitive increase/decrease of the current density was observed upon on/off of the light irradiation, indicating that the current density was responsive to light.

Figure 13:
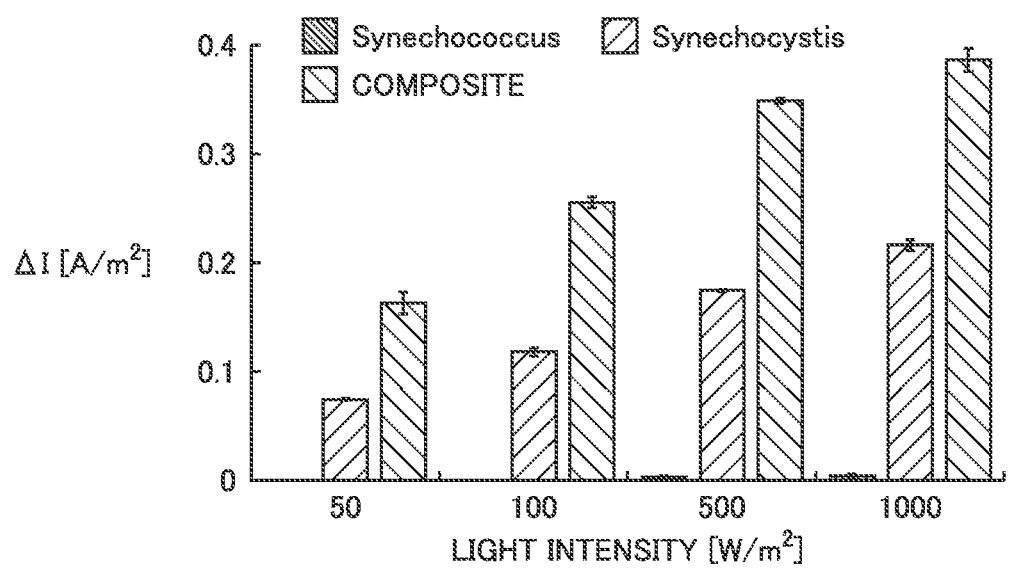
FIG. 13 shows a graph of results regarding the dependence, on artificial sunlight intensity, of current density increments ΔI in response to artificial sunlight irradiation in Comparative Experiment 2.

FIG. 13 shows a graph of results regarding the dependence, on artificial sunlight intensity, of current density increments AI in response to artificial sunlight irradiation in Comparative Experiment 2, in which the vertical axis represents ΔI (A/m$^2$) and the horizontal axis represents light intensity (W/m$^2$). As shown in FIG. 13, in each of the above cases, the current density increased along with an increase in light intensity. Here, when the values at a light intensity of 1000 W/m$^2$ were compared, the current density for *Synechocystis* alone (it is assumed that one *Synechocystis* cell was carried inside one pore, assumed from the relationship between the average particle size and the pore size of the first electrode) was about 42 times the current density for *Synechococcus* alone (it is assumed that nineteen *Synechococcus* cells were carried inside one pore, assumed from the relationship between the average particle size and the pore size of the first electrode). On the other hand, the current density for the composite (*Synechocystis*-(positively-charged magnetic nanoparticles)-*Synechococcus*) (it is assumed that one *Synechocystis* cell and twelve *Synechococcus* cells were carried inside one pore, assumed from the relationship between the average particle size and the pore size of the first electrode) was about 76 times the current density for *Synechococcus* alone. This has proven that, when each pore carries electron-donating microorganisms of different classifications or different electron-donating microorganisms of the same classification, and/or electron-donating microorganisms with average particle sizes significantly different from each other, as compared to when each pore carries *Synechocystis* alone or *Synechococcus* alone, a synergistically high current density was achieved, which was more than just a simple addition of the current density for one *Synechocystis* cell alone and that for twelve *Synechococcus* cells alone.

Comparative Experiment 3

Figure 14:
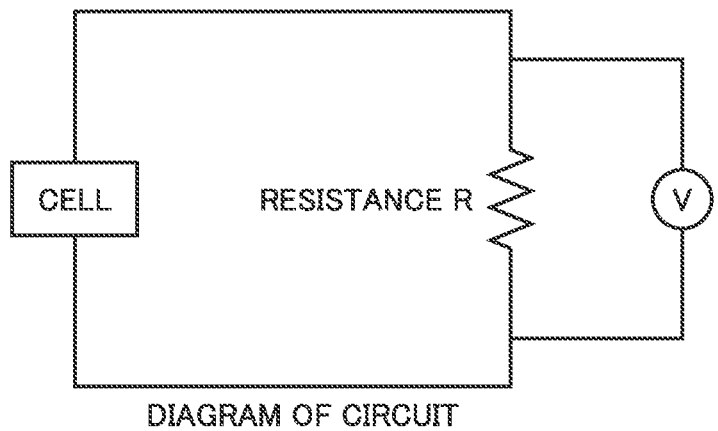
FIG. 14 includes FIG. 14(a) which is a schematic diagram of an electric circuit for power evaluation used in Comparative Experiment 3, and FIG. 14(b) which is a schematic diagram of a microbial solar cell 41 for power evaluation used in Comparative Experiment 3.
Figure 14:
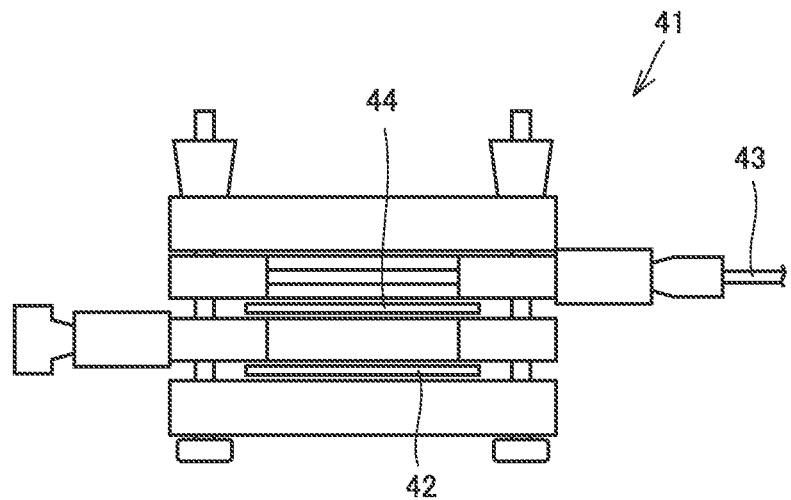

FIG. 14(*a*) is a schematic diagram of an electric circuit for power evaluation used in Comparative Experiment 3, and FIG. 14(*b*) is a schematic diagram of microbial solar cell 41 for power evaluation used in Comparative Experiment 3. Microbial solar cell 41 comprises, as an anode 42, the first electrode prepared in the above manner that carries a composite (*Synechocystis*-(positively-charged magnetic nanoparticles)-*Synechococcus*) inside the pore. To the anode side, the composite ($3\times10^8$ cells/mL), 10 mM phosphate buffer, and 1 mM p-benzoquinone (an electron transfer substance) were added. A platinum wire was used as a cathode 43, and between anode 42 and cathode 43, a Nafion film (registered trademark) was interposed as a diaphragm 44. To the cathode side, 10 mM potassium ferricyanide was added.

Figure 15:
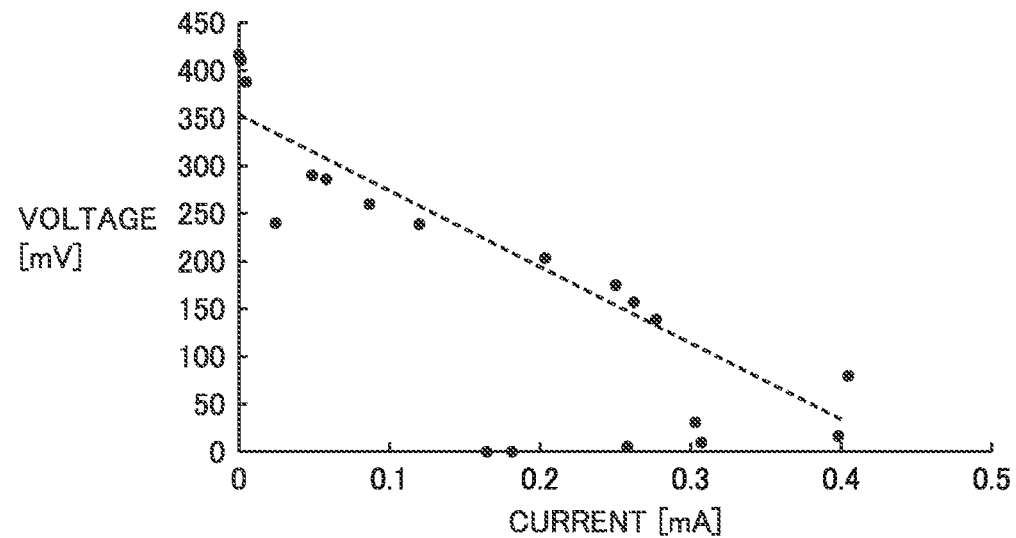
FIG. 15 includes FIG. 15(a) which a graph showing I-V relationship obtained under artificial sunlight irradiation in Comparative Experiment 3, and FIG. 15(b) which is a graph showing I-P relationship obtained under artificial sunlight irradiation in Comparative Experiment 3.
Figure 15:
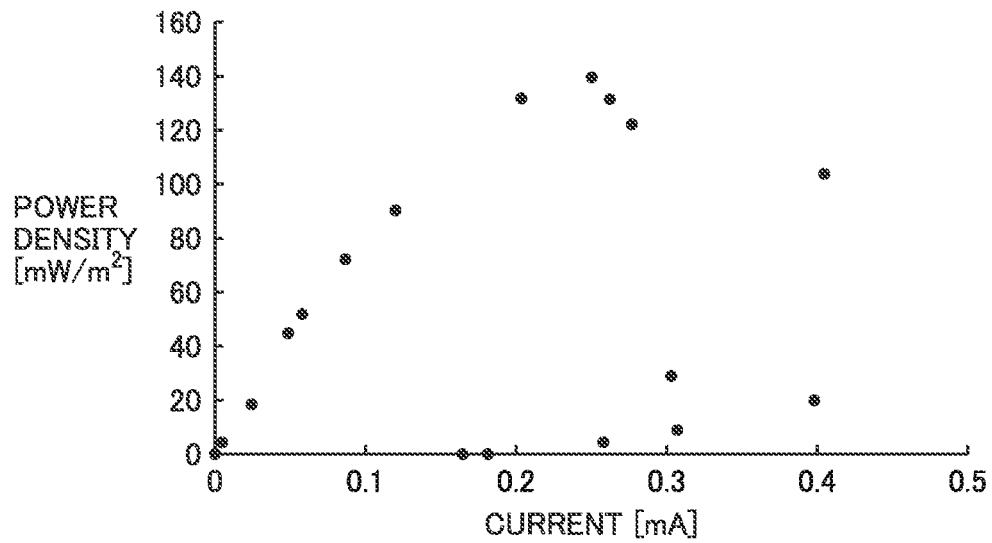

In Comparative Experiment 3, firstly, resistance R of the electric circuit shown in FIG. 14(*a*) was changed between 500Ω and 10 MΩ to measure voltage V. From the measured value, current I and power P were calculated. From the I-V relationship (in a graph with voltage V on the vertical axis and current I on the horizontal axis, the intercept represents open circuit voltage $V_{oc}$ and the slope represents internal resistance $R_{int}$) and the I-P relationship (in a graph with power density P on the vertical axis and current I on the horizontal axis, the peak represents the maximum power $P_{max}$), battery properties $V_{oc}$, $R_{int}$, and $P_{max}$ were calculated. FIG. 15(*a*) is a graph showing the I-V relationship obtained in Comparative Experiment 3, in which the vertical axis represents voltage V (mV) and the horizontal axis represents current I (mA). FIG. 15(*b*) is a graph showing the I-P relationship obtained in Comparative Experiment 3, in which the vertical axis represents power density (mW/m$^2$) and the horizontal axis represents current I (mA). As a result, the open circuit voltage $V_{oc}$ was 417.52 mV, the internal resistance $R_{int}$ was 798.79Ω, and the maximum power $P_{max}$ was 139.411 mW/m$^2$.

Comparative Experiment 4

Figure 16:
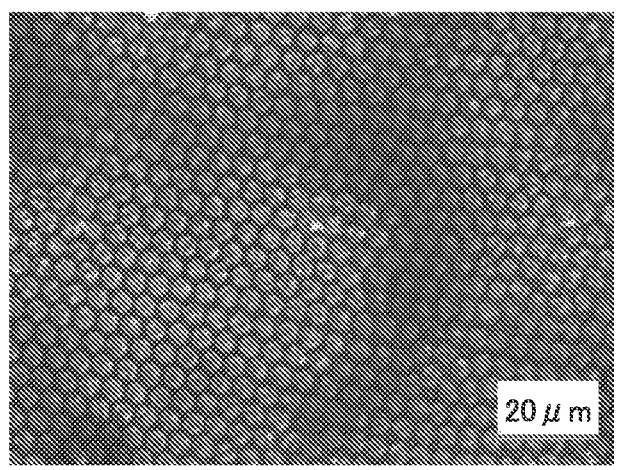
FIG. 16 shows results of Comparative Experiment 4, with FIG. 16(a) being a fluorescence micrograph when magnetic force was used and FIG. 16(b) being when convection generated by laser light was used.
Figure 16:
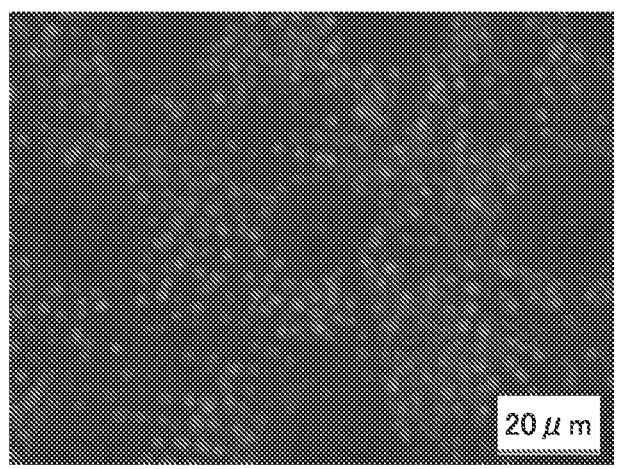

As the method for trapping electron-donating microorganisms inside the pores in the first electrode, use of magnetic force with the use of the composite (*Synechocystis*-(positively-charged magnetic nanoparticles)-*Synechococcus*) as described above and use of convection generated by laser light were compared. For the case using magnetic force, 50 µL of a bacterial liquid containing the composite was used, and for the case using convection generated by laser light, 50 µL of a bacterial liquid containing *Synechocystis* and *Synechococcus* in the same amount as the amount of *Synechocystis* and *Synechococcus* constituting the composite was used. For trapping by magnetic force, a neodymium magnet was used as in Comparative Experiment 1. For trapping by convection generated by laser light, irradiation of 100 points of laser beams was performed with a laser wavelength of 1064 nm, an output after cover glass transmission of 0.021 W (output was 0.04 W), oil lens of 100 times magnification, an irradiation time of 20 seconds per point, and an irradiation interval of 50 µm. FIG. 16 shows results of Comparative Experiment 4, with FIG. 16(*a*) being a fluorescence micrograph (100 times magnification) when magnetic force was used and FIG. 16(*b*) being when convection generated by laser light was used.

Figure 17:
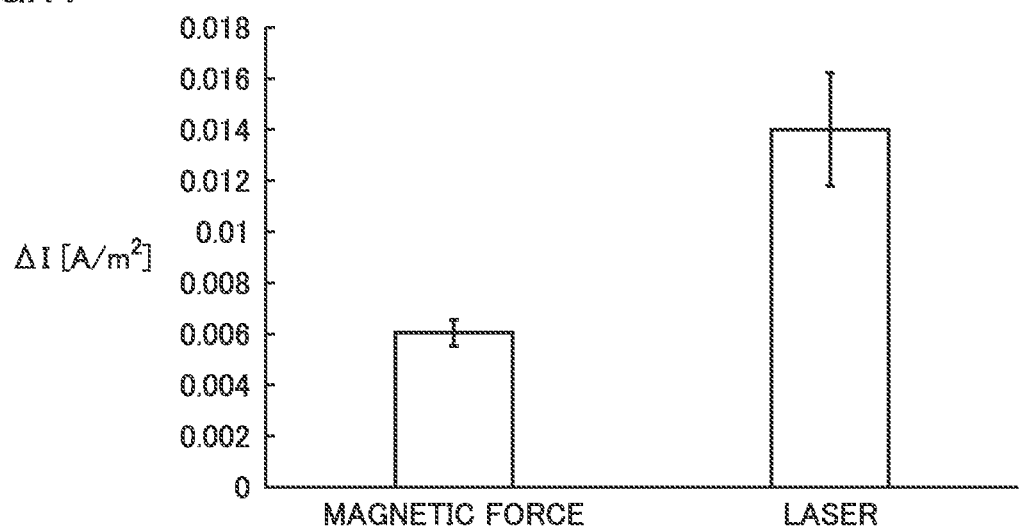
FIG. 17 is a graph of current density increments ΔI upon artificial sunlight irradiation in Comparative Experiment 4, when magnetic force was used and when convection generated by laser light was used.

For each of the above cases, namely use of magnetic force and use of convection generated by laser light, the first electrode having electron-donating microorganisms trapped inside was installed into an anode electrode evaluation cell described above in Comparative Experiment 2, followed by current measurement under voltage application of 0.6 V and artificial sunlight irradiation of 1000 W/m$^2$. FIG. 17 is a graph of current density increments ΔI upon artificial sunlight irradiation in Comparative Experiment 4, when electron-donating microorganisms were trapped by magnetic force and when electron-donating microorganisms were trapped by convection generated by laser light. The vertical axis represents ΔI (A/m$^2$). As shown in FIG. 17, when convection generated by laser light was used, ΔI was about 2.5 times higher than when magnetic force was used, indicating that use of convection generated by laser light can accumulate electron-donating microorganisms more densely inside the pore.

INDUSTRIAL APPLICABILITY

The electrochemical device according to the present invention is suitable for keeping microorganisms inside and growing them and also has excellent electrochemical properties, and therefore it is widely applicable to microbial fuel cells, microbial electrolytic cells, biosensors, microbial solar cells, optical sensors, and the like.

REFERENCE SIGNS LIST 1 microbial solar cell; 2 electrolytic compartment; 3 anode; 4 cathode; 5 electrolyte solution; 6 external circuit; 7 electron-donating microorganism; 8 sunlight; 9 electron; 21 composite; 22 electron-donating microorganism; 23 electron-donating microorganism; 24 magnetic nanoparticle; 31 pore; 32 magnet; 41 microbial solar cell; 42 anode; 43 cathode; 44 diaphragm.

The invention claimed is:
1. An electrochemical device, comprising:
a first electrode comprising a surface layer portion having at least one pore with an opening, wherein
the pore has a conductive section at least on an inner face thereof,
the first electrode has a conduction path that electrically connects the conductive sections of the pores to each other, and
each pore carries electron-donating microorganisms of different classifications or different electron-donating microorganisms of the same classification.
2. The electrochemical device according to claim 1, wherein the electron-donating microorganisms are Cyanobacteria.
3. The electrochemical device according to claim 2, wherein the electron-donating microorganisms are a combination of *Synechocystis* and *Synechococcus*.
4. The electrochemical device according to claim 1, wherein the surface layer portion has a plurality of pores arranged in a honeycomb shape.
5. The electrochemical device according to claim 1, wherein irradiation of light having a wavelength capable of causing photosynthesis is performed.
6. The electrochemical device according to claim 1, wherein the electron-donating microorganisms are negatively charged, and the electron-donating microorganisms are bonded to each other via positively-charged magnetic nanoparticles to form a composite.

7. The electrochemical device according to claim 1, wherein the electrochemical device comprises the first electrode as an anode and comprises a second electrode as a cathode, and the second electrode is different from the first electrode.

8. An electrochemical device, comprising:
a first electrode comprising a surface layer portion having at least one pore with an opening, wherein
the pore has a conductive section at least on an inner face thereof,
the first electrode has a conduction path that electrically connects the conductive sections of the pores to each other, and
each pore carries electron-donating microorganisms with average particle sizes significantly different from each other.

9. The electrochemical device according to claim 8, wherein the electron-donating microorganisms with average particle sizes significantly different from each other are the same electron-donating microorganisms of the same classification.

10. The electrochemical device according to claim 8, wherein the electron-donating microorganisms are Cyanobacteria.

11. The electrochemical device according to claim 10, wherein the electron-donating microorganisms are a combination of *Synechocystis* and *Synechococcus*.

12. The electrochemical device according to claim 8, wherein the surface layer portion has a plurality of pores arranged in a honeycomb shape.

13. The electrochemical device according to claim 8, wherein irradiation of light having a wavelength capable of causing photosynthesis is performed.

14. The electrochemical device according to claim 8, wherein the electron-donating microorganisms are negatively charged, and the electron-donating microorganisms are bonded to each other via positively-charged magnetic nanoparticles to form a composite.

15. The electrochemical device according to claim 8, wherein the electrochemical device comprises the first electrode as an anode and comprises a second electrode as a cathode, and the second electrode is different from the first electrode.

* * * * *